US 7,836,299 B2

(12) United States Patent
England et al.

(10) Patent No.: US 7,836,299 B2
(45) Date of Patent: Nov. 16, 2010

(54) VIRTUALIZATION OF SOFTWARE CONFIGURATION REGISTERS OF THE TPM CRYPTOGRAPHIC PROCESSOR

(75) Inventors: Paul England, Bellevue, WA (US); Matthew C. Setzer, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1028 days.

(21) Appl. No.: 11/080,906

(22) Filed: Mar. 15, 2005

(65) Prior Publication Data

US 2006/0212939 A1 Sep. 21, 2006

(51) Int. Cl.
*H04L 29/06* (2006.01)
*G06F 11/30* (2006.01)

(52) U.S. Cl. ............ 713/162; 713/164; 713/165; 713/166; 713/167; 713/189; 713/193

(58) Field of Classification Search .......... 713/150, 713/155–156, 164–167, 175–176, 180, 187–189, 713/193; 711/100, 147–148; 717/120–121, 717/127; 718/1
See application file for complete search history.

(56) References Cited

U.S. PATENT DOCUMENTS

| | | | | |
|---|---|---|---|---|
| 2002/0194496 | A1* | 12/2002 | Griffin et al. | 713/200 |
| 2003/0188113 | A1* | 10/2003 | Grawrock et al. | 711/156 |
| 2003/0226031 | A1* | 12/2003 | Proudler et al. | 713/200 |
| 2005/0138370 | A1* | 6/2005 | Goud et al. | 713/164 |
| 2005/0210467 | A1* | 9/2005 | Zimmer et al. | 718/1 |
| 2005/0246552 | A1* | 11/2005 | Bade et al. | 713/193 |
| 2006/0015717 | A1* | 1/2006 | Liu et al. | 713/164 |
| 2006/0020781 | A1* | 1/2006 | Scarlata et al. | 713/100 |
| 2006/0026422 | A1* | 2/2006 | Bade et al. | 713/164 |
| 2006/0116989 | A1* | 6/2006 | Bellamkonda et al. | 707/3 |

OTHER PUBLICATIONS

"TPM Main: Part 1 Design Principles," Specification Version 1.2 Revision 61, Oct. 2, 2003, TCG Published.*
"Trusted Platform Module", (TPM), Specification Version 1.2, Revision 85, Feb. 13, 2005, Part I, II, and III plus Revision 1.2.
Leach, P.J., "Application Based Authorization Model", Version 0.97, http://winweb/security/appsec/documents/programprincipals.doc, 6 pages, retrieved Dec. 20, 2005.
Leach, P.J., "Applications as Security Principals", ersion 0.76, http://winweb/security/appsec/documents/appaccess2objects.doc, 7 pages, retrieved Dec. 20, 2005.

* cited by examiner

*Primary Examiner*—Beemnet W Dada
*Assistant Examiner*—Darren Schwartz
(74) *Attorney, Agent, or Firm*—Woodcock Washburn LLP

(57) ABSTRACT

A virtual PCR (VPCR) construct is provided that can be cryptographically tagged as optionally resettable or as enduring for the life of a client (process, virtual machine, and the like) and that can be loaded into a resettable hardware PCR to make use of the functionality of a Trusted Platform Module (TPM). The VPCRs may cryptographically reflect their characteristics (resettable or not) in their stored values. Also, since the PCRs are virtualized, they are (effectively) unlimited in number and may be given general names (UUIDs) that are less likely to collide. The VPCRs can be loaded into a physical PCR as needed, but in a way that stops one piece of software from impersonating another piece of software. The VPCRs thus enable all software using the TPM to be given access to TPM functionality (sealing, quoting, etc.) without security concerns.

15 Claims, 5 Drawing Sheets

VIRTUALIZATION OF SOFTWARE CONFIGURATION REGISTERS OF THE TPM CRYPTOGRAPHIC PROCESSOR

FIELD OF THE INVENTION

The invention is directed to systems and methods for storing and reporting the identity of software running on a software platform and, more particularly, the invention is directed to systems and methods of virtualizing software configuration registers that report the identity of software running on a software platform to a cryptographic processor of a Trusted Platform Module (TPM).

BACKGROUND OF THE INVENTION

Computer users are increasingly concerned about the security threats posed by viruses, worms, Trojan horses, identity theft, software and media content piracy, and extortion using threats of data destruction. Conventional operating systems provide numerous security features to guard against such attacks. For example, a Trusted Platform Module (TPM) ensures the trustworthiness of software that is run on a computer by submitting trusted measurements of data to the TPM and relying on the TPM to determine if the measurement is what it should be. Computer security is often dependent on being able to predict the behavior of software components. In general, the security of a system may flow from the premise that a known program whose behavior is understood, which proceeds from a known good state, will act in a predictable manner. Conversely, the thwarting of security—which may involve getting a computer system to behave in ways that are outside the contemplation of its designer—can generally be realized by replacing or changing a known program, or running it in a state in which its behavior is not understood. Thus, one aspect of providing security for a computing environment includes verifying that a known program is being used, and that it is proceeding from a known good state. The TPM accomplishes this by validating that data is what it should be because a measurement such as a hash of the data matches a value previously sealed in the TPM.

Most TPMs today conform to the TRUSTED COMPUTING GROUPS® (TCG) standard, entitled "Trusted Platform Module (TPM) Specification Version 1.2" (referred to herein as "TPM specification"). The TPM is a subsystem that may be incorporated into computing platforms to establish trust for the code that is executed by a platform. Standardization of mechanisms for establishing trustworthy code is beneficial because it allows the security and cryptographic community to assess the mechanisms for providing security, and because it promotes customer understanding and trust of new software features. It also encourages innovation in implementing and improving the standard, as contemplated and encouraged by the TCG®.

The TPM specification defines a TPM that provides cryptographic functions using a cryptographic processor designed to provide trust in the software platform. Since this component is implemented in hardware, it has finite resources. The TCG Trusted Software Stack (TSS) specification defines a software stack that makes use of the TPM resources to provide application-level functionality that uses the TPM resources to provide trust operations for applications. The TSS allows some sharing of limited TPM resources across multiple applications; however, no provision is made for running a TSS implementation side-by-side with operating system software that may also be using TPM resources. Also, the TSS does not permit multiple operating system instances to be run on a platform, each with its own TSS instances, all of which are running on a single physical TPM.

The TPM has several facilities for supporting access control systems based on software identity. The primary facilities include local software authentication, remote software authentication, and authorized access to local data. Each of these facilities uses PCRs and are thus limited by the PCR's limitations.

In the case of local software authentication, when the TPM is incorporated into a compliant hardware platform, the platform reliably measures and reports the identity of the running software to the TPM. Such authentication may include authentication of low level system software including the BIOS, option ROMs, master boot record, and the like, as well as reliable authentication of an isolation kernel or hypervisor started some time after platform boot. In each case, the TPM and the software platform arrange that the cryptographic hash of the program (e.g., the hypervisor, or operating system loader) is written into a PCR of the TPM. Since programs typically run other programs, a piece of software that has been authenticated might want to "qualify its identity" by changing the PCR to reflect this sort of state change. However, a program should not be able to make unconstrained changes to a PCR value, as this would, for example, allow one operating system, such as Linux, to impersonate another operating system, such as Windows. Accordingly, to securely support changes to the PCRs, PCRs behave like logs to which information is written but may not be removed. To prevent the PCRs from needing unlimited storage, the "log" is typically implemented as a one-way hash function. New information is "hashed into" the PCR, and once it is hashed in it cannot be unhashed because the function is one-way. This function is called "extend" in the TPM specification referenced above. Also, in general, PCRs are only reset when new software is booted. Typically, the TPM has a limited number of PCRs (e.g., 24), only a few of which can be reset under software control.

In the case of remote software authentication, as where a server tests to determine what software is running in different virtual machine (VM) partitions, the TPM contains a key that can be used to "sign" the contents of PCR registers (and other data, to guarantee freshness, associate with the current PCR contents, and the like). The TPM key can be used in cryptographic protocols of the TPM's cryptographic processor to authenticate running software to remote entities. However, for this to work, relying parties have to establish trust in the TPM key. This must be done out of band using, for example, a certificate authority in a process referred to in the TPM specification as "quoting."

In the case of authorized access to local data, the TPM can protect access to data so that the data is only accessible when the platform (as reflected in the contents of PCR registers) is in an approved state. Because storage on the TPM is limited, this operation is implemented using an authenticated encryption primitive. The TPM specification refers to this process as "sealing."

Unfortunately, there are several problems with PCRs as implemented in the TPM which limit their use in such TPM facilities. For example, from a software perspective, PCRs are a limited resource. The PCRs that are "for system use" are not limiting if one is booting one operating system; however, if one wishes, for example, to grant TPM access to multiple operating systems running simultaneously in a virtual machine environment, there is the potential that the PCRs will step on each other and cause each other to crash. This problem may even arise in the absence of a virtual machine environment when several applications wish to use PCRs simultaneously. For example, a virus checker may wish to register the hash of the virus definition file, while an audit service may wish to use a PCR to protect logs, while a dozen instances of Common Language Runtime (CLR), a Microsoft software platform that enables developers to write components in multiple languages and have them interoperate, may each wish to hash the assembly they are running into a PCR. The potential for such scenarios may lead to PCR conflict. Also, though a PCR generally provides a one to one mapping of programs to PCRs, when a particular PCR is "quoted," no mechanism is provided for determining whether the "quoted" PCR was used by the expected program (e.g., the virus checker).

PCRs are further limited in that they are (mostly by design) never reset. This is acceptable for system use (e.g. an audit log), but is more difficult for general application use (e.g. an instance of Microsoft's Internet Information Services (IIS) that wants to protect its logs). Moreover, those PCRs that are resettable generally do not have any interesting policy around when they are reset. Basically, a couple of the TPM's PCRs can be reset by a running hypervisor, while only one PCR can be reset by anyone. This inability to reset most of the PCRs may lead to the proliferation of an error once an error has been introduced.

Thus, despite their extensive use in TPMs, PCRs are limited in number, most are never reset (by design), and those that are resettable do not have any interesting policy concerning when they can be reset and by whom. The invention addresses these limitations in the art.

SUMMARY OF THE INVENTION

The invention addresses the above-mentioned limitations in the art by implementing a virtual PCR (VPCR) construct that can be cryptographically tagged as optionally resettable or as enduring for the life of a client (process, virtual machine, and the like) and that can be loaded into a resettable hardware PCR to make use of TPM functionality (sealing, quoting, and the like). The VPCRs in accordance with the invention also cryptographically reflect their characteristics (resettable or not) in their stored values. Also, since the PCRs are virtualized, they are (effectively) unlimited in number and may be given general names (UUIDs) that are less likely to collide (i.e., there is no 1 to 1 correspondence between programs and PCRs). The VPCRs of the invention are further characterized in that they deny direct access to physical PCRs but can be loaded into a physical PCR as needed, but in a way that stops one piece of software from impersonating another piece of software. Accordingly, the invention enables all software using the TPM to be given access to TPM finctionality (sealing, quoting, etc.).

In exemplary embodiments, a system is provided that checks an application program of a software platform to determine if the application program can be trusted by the software platform. Such a system in accordance with the invention includes a Trusted Platform Module (TPM) including a cryptographic processor and at least one physical platform control register (PCR) and a TPM interface that controls access to the physical PCRs of the TPM by application programs for storage of a log of values representative of the state of the application program. In accordance with the invention, the TPM interface virtualizes at least one physical PCR of the TPM, provides a mechanism to name a virtualized PCR with a global identifier, provides selective access by the application program to the identified virtualized PCR for storage of the log of values for the application program, and modifies or resets the identified virtualized PCR to a value representative of a trusted state of the application program. The TPM interface prohibits anything other than the TPM interface from modifying or resetting the identified virtualized PCR. Thus, the PCR may be reset to a known state whereby all historical information is not lost.

In accordance with the invention, the TPM interface loads a virtualized PCR into a resettable physical PCR of the TPM when TPM functions such as TPM quoting, TPM extend, or TPM sealing are to be applied to values stored in the virtualized PCR.

In accordance with another aspect of the invention, the TPM interface starts the identified virtualized PCR at a start value representative of behavior of the identified virtualized PCR, such as whether the identified virtualized PCR is resettable or not.

The TPM interface of the invention enables application programs to command the TPM to create a data structure containing the contents of the identified virtualized PCR and its name, hash the data structure, and reset and load a physical PCR of the TPM with the hashed value. Two or more such data structures may also be hashed together by the TPM interface and then loaded into the physical PCR for application of TPM functions to the hashed value. In this fashion, more than one virtual PCR may hold information about the application program yet the TPM finctions may still be applied to all of the stored information.

In accordance with another aspect of the invention, the TPM interface may initialize at least one virtualized PCR with information of interest to the application program. For example, such information may include: a security identifier of the application program, a virtual machine identifier of a virtual machine partition using the virtualized PCR, a process identifier for the application program, a hash of a BIOS that booted an operating system of the application program in a virtual machine environment, and a credential based on an identity of the application program.

The scope of the invention also includes associated methods and computer readable media including software that perform the methods of the invention when read by a suitable computer system. Additional characteristics of the invention will be apparent to those skilled in the art based on the following detailed description.

BRIEF DESCRIPTION OF THE DRAWINGS

The systems and methods for virtualizing PCRs in accordance with the present invention are further described with reference to the accompanying drawings, in which.

DETAILED DESCRIPTION OF ILLUSTRATIVE EMBODIMENTS

Certain specific details are set forth in the following description with respect to FIGS. 1-5 to provide a thorough understanding of various embodiments of the invention. Certain well-known details often associated with computing and software technology are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Overview

The invention implements a virtual PCR (VPCR) construct that can be cryptographically tagged as optionally resettable or as enduring for the life of a client (process, virtual machine, and the like) and that can be loaded into a resettable hardware PCR to make use of TPM functionality (sealing, quoting, and the like). The VPCRs may also cryptographically reflect their characteristics (resettable or not) in their stored values. Also, since the PCRs are virtualized, they are (effectively) unlimited in number, need not correspond 1 to 1 to a particular program, and may be given general names (UUIDs) that are less likely to collide. The VPCRs are further characterized in that they deny direct access to physical PCRs but can be loaded into a physical PCR as needed, but in a way that stops one piece of software from impersonating another piece of software. The invention thus enables all software using the TPM to be given access to TPM functionality (sealing, quoting, etc.) without security concerns.

Exemplary Computing and Networked Environments

Figure 1:
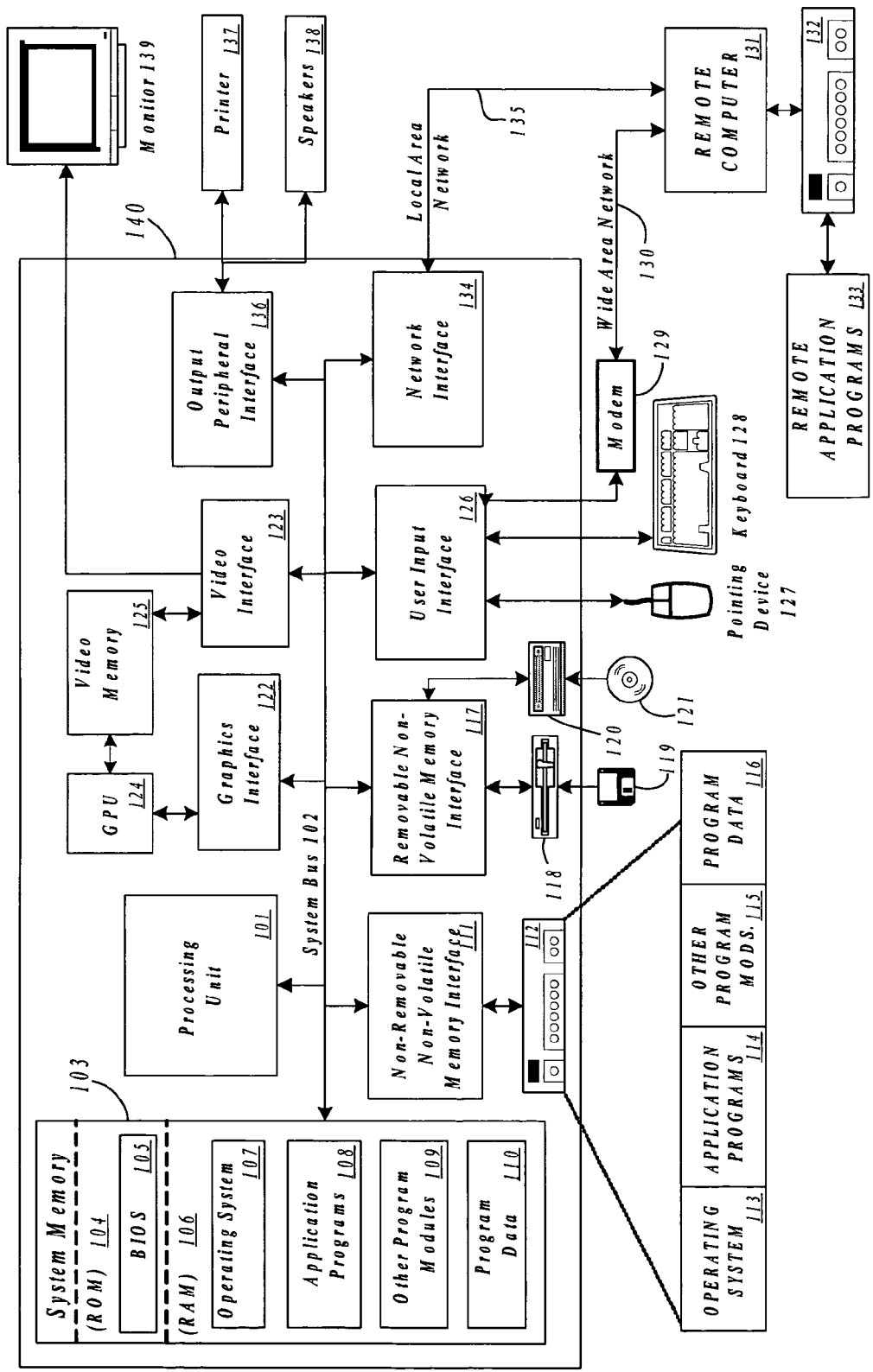
FIG. 1 sets forth a computing environment that is suitable to implement the software and/or hardware techniques associated with the invention.

The computing system environment 100 in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 illustrates an exemplary system for implementing the invention, including a general purpose computing device in the form of a computer 121. Components of computer 121 may include, but are not limited to, a processing unit 101, a system memory 103, and a system bus 102 that couples various system components including the system memory to the processing unit 101. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Figure 3:
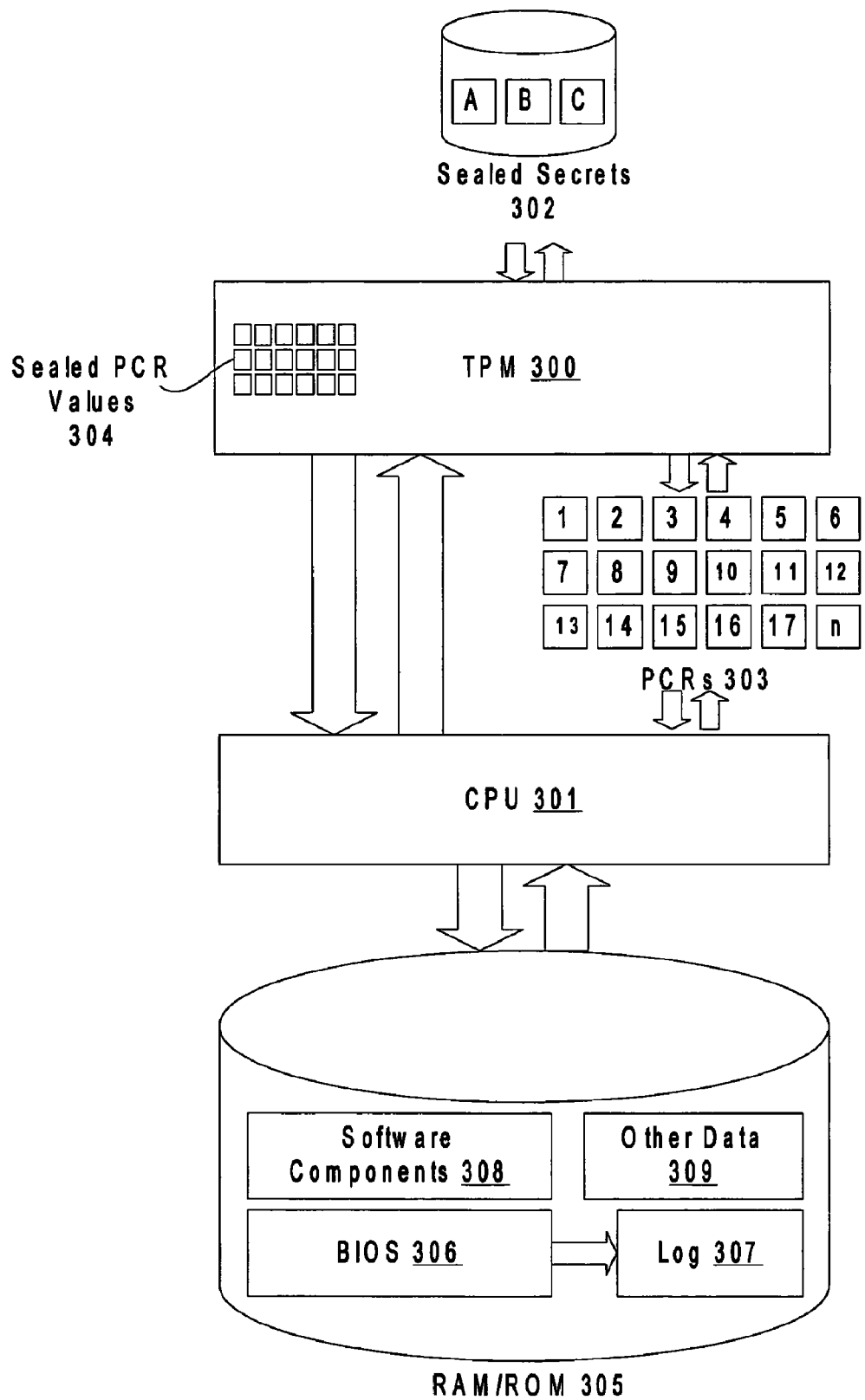
FIG. 3 illustrates a computing platform that makes use of a Trusted Platform Module (TPM).

A TPM is not shown in FIG. 1, though a TPM may be a part of computers that implement the invention. FIG. 3 shows a TPM that is integrated with components of a computer and will be discussed in further detail below. Typically, a TPM is a hardware chip that is welded to the motherboard or integrated into a chipset or other hardware component of a computer such as that of FIG. 1 for the purpose of providing a range of security functions including the TPM functions described herein. However, for the purpose of this specification, it should be understood that the TPM may be implemented in hardware or software and is defined broadly as a functional unit that can provide those trusted functions that are needed for operation including, for example, comparison and verification of measurements submitted to it, and release of keys for access to encrypted memory resources. The TPM may also provide a range of other functions, as described in the afore-mentioned TPM specification.

Computer 140 typically includes a variety of computer readable media, which may include any available media that can be accessed by computer 140 and includes volatile and nonvolatile media as well as removable and non-removable media. By way of example, and not limitation, computer readable media may comprise computer storage media and communication media. Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 140. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media in accordance with the invention.

The system memory 103 includes computer storage media in the form of volatile and/or nonvolatile memory such as read only memory (ROM) 104 and random access memory (RAM) 106. A basic input/output system 105 (BIOS), containing the basic routines that help to transfer information between elements within computer 121, such as during start-up, is typically stored in ROM 104. RAM 106 typically contains data and/or program modules that are immediately accessible to and/or presently being operated on by processing unit 101. By way of example, and not limitation, FIG. 1 illustrates operating system 107, application programs 108, other program modules 109, and program data 110.

The computer 121 may also include other removable/non-removable, volatile/nonvolatile computer storage media. By way of example only, FIG. 1 illustrates a hard disk drive 112 that reads from or writes to non-removable, nonvolatile magnetic media, a magnetic disk drive 118 that reads from or writes to a removable, nonvolatile magnetic disk 119, and an optical disk drive 120 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 112 is typically connected to the system bus 102 through a non-removable memory interface such as interface 111, and magnetic disk drive 118 and optical disk drive 120 are typically connected to the system bus 102 by a removable memory interface, such as interface 117.

The drives and their associated computer storage media discussed above and illustrated in FIG. 1, provide storage of computer readable instructions, data structures, program modules and other data for the computer 121. In FIG. 1, for example, hard disk drive 112 is illustrated as storing operating system 113, application programs 114, other program modules 115, and program data 116. Note that these components can either be the same as or different from operating system 107, application programs 108, other program modules 109, and program data 110. Operating system 113, application programs 114, other program modules 115, and program data 116 are given different numbers here to illustrate that, at a minimum, they are different copies. A user may enter commands and information into the computer 121 through input devices such as a keyboard 128 and pointing device 127, commonly referred to as a mouse, trackball or touch pad. Other input devices (not shown) may include a microphone, joystick, game pad, satellite dish, scanner, or the like. These and other input devices are often connected to the processing unit 101 through a user input interface 126 that is coupled to the system bus, but may be connected by other interface and bus structures, such as a parallel port, game port or a universal serial bus (USB). A monitor 139 or other type of display device is also connected to the system bus 102 via an interface, such as a video interface 123. In addition to the monitor, computers may also include other peripheral output devices such as speakers 138 and printer 137, which may be connected through an output peripheral interface 136.

The computer 121 may operate in a networked environment using logical connections to one or more remote computers, such as a remote computer 131. The remote computer 131 may be a personal computer, a server, a router, a network PC, a peer device or other common network node, and typically includes many or all of the elements described above relative to the computer 121, although only a memory storage device 132 has been illustrated in FIG. 1. The logical connections depicted in FIG. 1 include a local area network (LAN) 135 and a wide area network (WAN) 130, but may also include other networks. Such networking environments are commonplace in offices, enterprise-wide computer networks, intranets and the Internet.

When used in a LAN networking environment, the computer 121 is connected to the LAN 135 through a network interface or adapter 134. When used in a WAN networking environment, the computer 121 typically includes a modem 129 or other means for establishing communications over the WAN 130, such as the Internet. The modem 129, which may be internal or external, may be connected to the system bus 102 via the user input interface 126, or other appropriate mechanism. In a networked environment, program modules depicted relative to the computer 121, or portions thereof, may be stored in the remote memory storage device. By way of example, and not limitation, FIG. 1 illustrates remote application programs 133 as residing on memory device 132. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
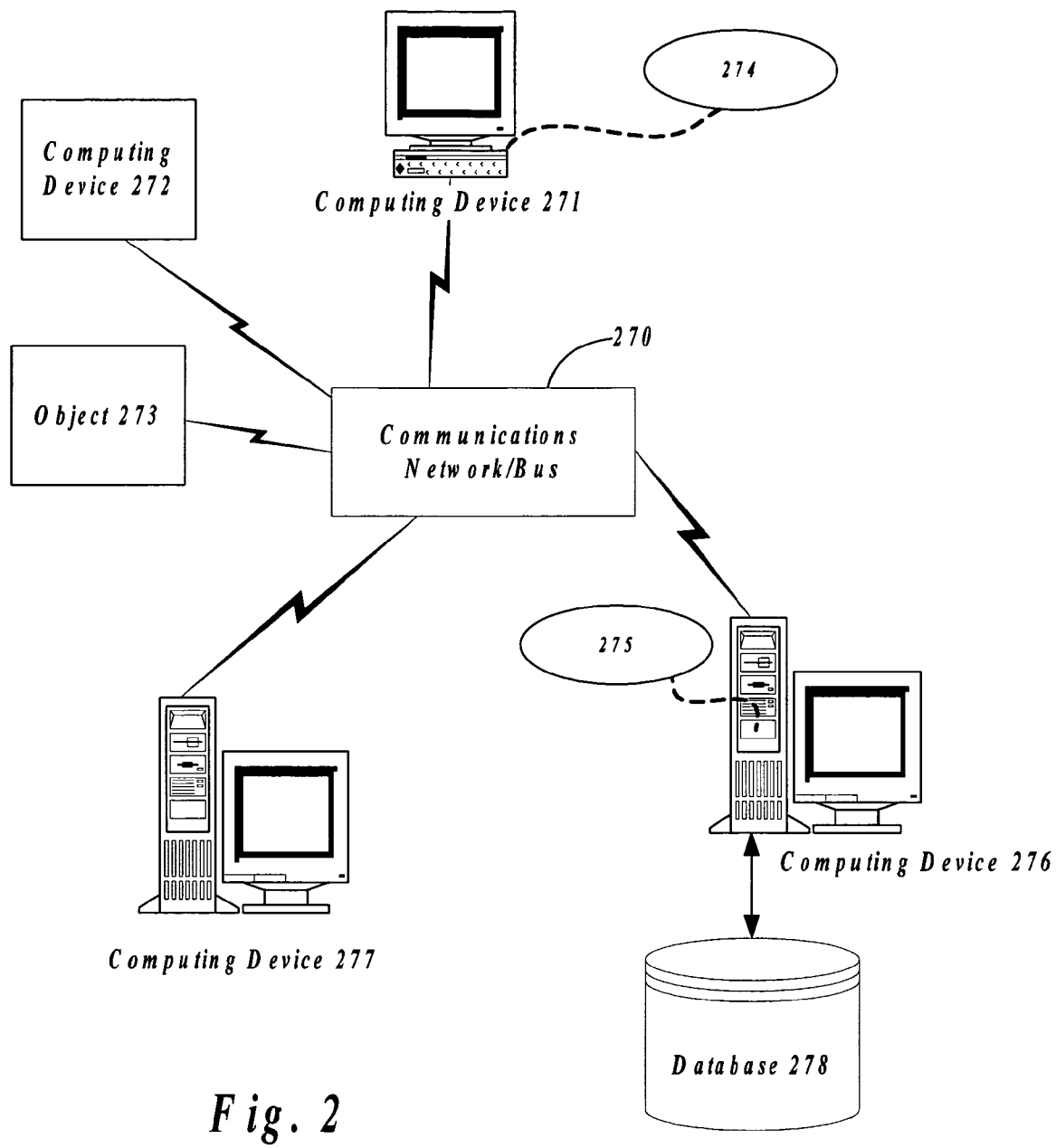
FIG. 2 provides an extension of the basic computing environment from FIG. 1 to emphasize that modem computing techniques can be performed across multiple networked devices.

An exemplary embodiment of a networked computing environment is illustrated in FIG. 2. One of ordinary skill in the art will appreciate that networks may connect any computer or other client or server device in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the finctionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 1, and the further diversification that can occur in computing in a network environment such as that of FIG. 2, the systems and methods provided herein cannot be construed as limited in any way to a particular computing architecture. Instead, the present invention should not be limited to any single embodiment, but rather should be construed in breadth and scope in accordance with the appended claims.

Virtualized PCRs

The invention provides solutions to the problems presented above by providing a software platform that allows transparent sharing of TPM resources, particularly PCRs, among multiple software stacks on the software platform. In particular, the invention provides a TPM base services software component on a software platform that supports partial virtualization of TPM functionality so as to allow sharing of the TPM cryptographic processor among multiple software stacks, whether or not such stacks are running in a single operating system instance or running an independent operating system instances (virtual machines) that are coexisting on the same physical machine. The TPM base services component of the invention provides a layer that virtualizes the limited TPM resources so that each software stack is able to use TPM resources without an awareness of any other software stacks that may be running on the machine.

A conventional TPM 300 with a cryptographic processor (not shown) is illustrated in the context of a computer architecture in FIG. 3. While the TPM 300 contemplated for use in embodiments of the invention may be TCG® 1.2 compliant, any Hardware Security Module (HSM) for validating measurements, such as those placed in PCRs, and unsealing secrets if the measurements are correct may be used. As illustrated in FIG. 3, TPM 300 provides security functions to CPU 301, which, in turn, accesses memory 305, in a highly generalized view of a computer such as that of FIG. 1. In general, the CPU 301 may first perform measurements of data involved in a process, and those measurements may be securely stored in the TPM 300, as illustrated by the sealed PCR values 304. As will be appreciated by those skilled in the art, in various embodiments the various PCR values stored in physical PCRs 303 and stored in TPM 300 at 304 illustrated in FIG. 3 may in fact be stored in one or more single storage locations that are extended by an algebraic formula, as defined in the TPM specification.

Secrets 302 may be sealed to the particular PCR values 304 in the TPM 300. To retrieve the secrets 302 from the TPM 300, correct PCR values must be entered into physical PCRs 303. As noted above, there is generally a 1 to 1 correspondence between the physical PCRs 303 and the application programs that are using the trusted services of the TPM 300. The correct PCR values may be obtained by measuring the same data that was measured to obtain PCR values 304 stored as secrets 302. Multiple secrets 302 may be sealed to a variety of PCRs 304. For example, to retrieve a first secret A, it may be required that a correct value be stored in PCR [1], PCR [2] and PCR [3]. To obtain a second secret B, a fourth correct value may be required in PCR [4].

If a measurement is placed in a physical PCR 303 that does not match a value for that measurement stored as secrets 302, then when the TPM 300 is requested to unseal a secret 302, the unseal will fail. If correct measurements are placed in physical PCRs 303, then the TPM 300 can be trusted to unseal secrets 302 when requested to do so. Therefore, a "correct" measurement, or correct value, for purposes of this application, is a measurement to which a secret 302 is sealed, and thereby permits unsealing of the secret 302 by the TPM 300. Note that a correct measurement could be, in some embodiments, a measurement of malicious code. This is the case, for example, when the initial measurements 304 stored as secrets 302 are corrupt.

The secrets sealed to particular measurements may be any data. Typically, secrets 302 will take the form of decryption keys and/or Binary Large Objects (BLOBS). In general, a key provides information that can be used to decrypt data. A sealed BLOB may contain a key as well as other data that may be useful. In this regard, equivalents for various techniques discussed herein may be constructed by substituting keys for BLOBS and vice versa, as will be appreciated by those of skill in the art. Thus, if a CPU 301 submits correct measurements to physical PCRs 303, then when a corresponding secret 302 such as a key is requested, the TPM 300 can unseal the secret 302. The key from 302 may then be used to decrypt portions of memory 305 accessible by the CPU 301. In the example illustrated in FIG. 3, TPM 300 may be configured to grant access to three secrets, A, B, and C. The secrets 302 may be sealed to various required PCR values, and therefore may be accessible only after certain measurements are performed. These three keys, or three secrets, may include, for example, a boot access only secret, a volume-bound secret, and a password secret.

TPM 300 related activity may be stored in a log 307. The log 307 may be maintained by the computer's BIOS 306 in some embodiments. Any other process may also be responsible for maintaining a log 307. Thus, if data such as a software component 308 or other data 309 is measured into a physical PCR 303, the data that was measured may be identified in the log 307. If a secret unseal request is made, the request event may be identified in the log 307. These are but two examples of storing TPM related activity in a log 307, which may contain records for a wide range of other events and activities.

Typically, TPM 300 operates in conjunction with a Static Root of Trust Measurement (SRTM) for performing trusted measurements and submitting them to the cryptographic processor of TPM 300. However, other processes for making secure measurements, such as through the use of a Dynamic Root of Trust Measurement (DRTM) Nexus are also available. The system may also extend the SRTM to measure other code and critical data involved in the early stages of booting an operating system so that any early stage of operating system boot can be measured. Thus, physical PCRs 303 may contain values obtained from anywhere, including measurements of data such as software components 308 or other data 309. The invention is not limited to any exclusive combination of data measurements or other values that are placed in physical PCRs 303.

Figure 4:
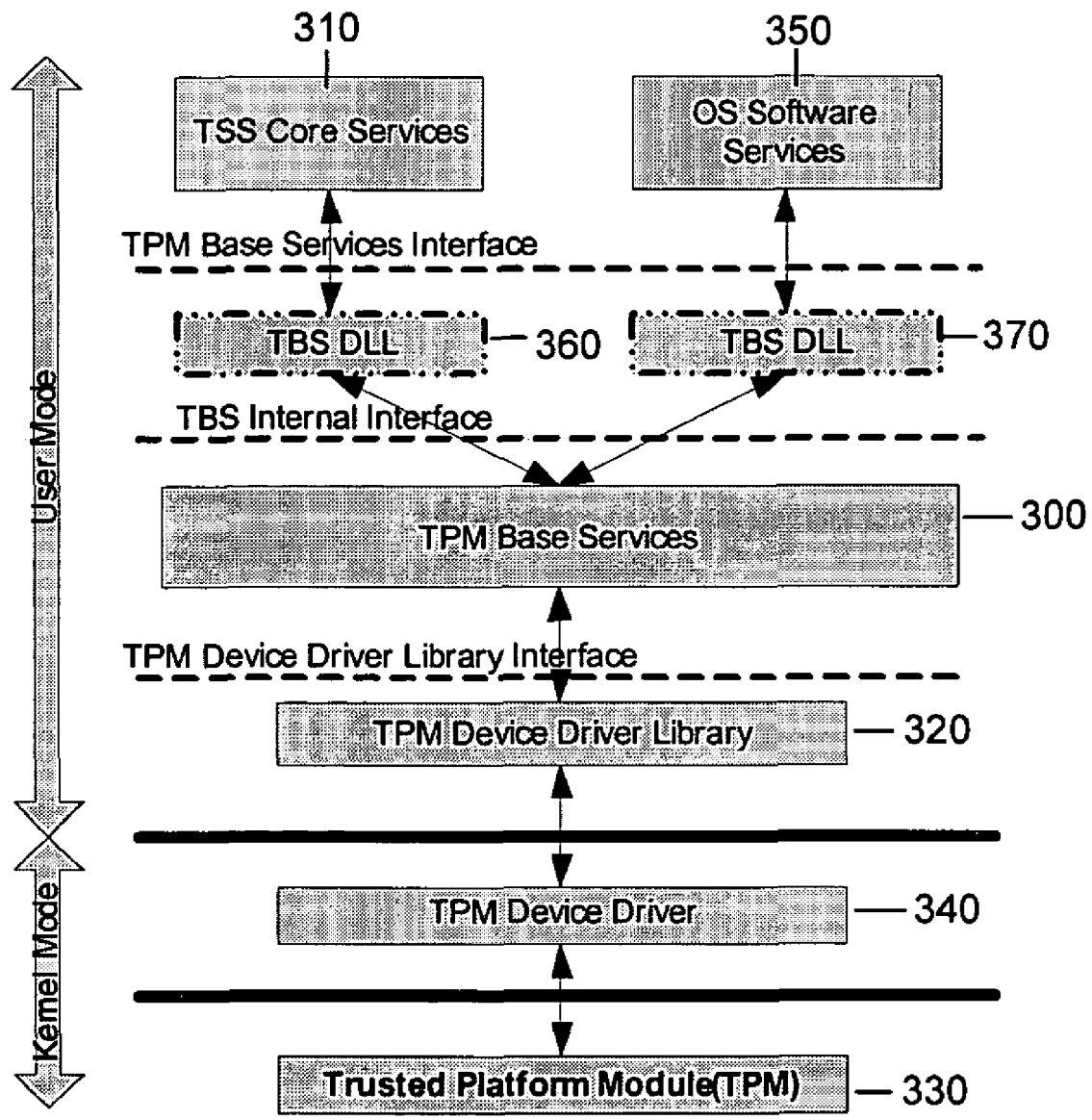
FIG. 4 illustrates the software configuration of the TPM base services of the invention.

As illustrated in FIG. 4, the TPM base services 310 of the invention are implemented between the TSS core services 320 and the TPM DLL layers 330 of the TCG software stack. The TPM 300 includes TPM device drivers 340 that provide user-mode code with access to the finctionality of TPM base services 310 of the invention. The TPM base services 310 of the invention may also provide access to operating system-specific software 350 that accesses the TPM 300 for trusted services. The TSS core services 320 and operating system-specific software 350 may selectively access the software component 300 of the invention through optional DLLs 360 and 370 (these DLLs are shown in broken line to illustrate that they are option). As will be explained in more detail below, the TPM base services 310 of the invention provides virtualization of the PCRs. As noted above, the physical PCRs 303 themselves are stored in a shielded location that is protected against interference and prying to ensure security of the PCR data.

In order to implement virtual PCRs (VPCRs) in accordance with the invention, it is desired to ensure that different entities (e.g., TSS core services 320 and operating system specific software 350 of FIG. 4) cannot access each other's resources. Accordingly, each command submitted to the TPM base services 310 is associated with a specific entity. This is done by having an entity that wants to access the TPM 300 to create a context, which is then associated with each subsequent command submitted by the entity. The context has certain parameters associated with it that affect all commands from that context, such as the default command priority and the locality that commands should be submitted from. An entity should create the context before it first accesses the TPM base services 310 and maintain the context until it is finished performing accesses to the VPCRs of the invention. For example, in the case of a TSS from TSS core services 320, the TSS would create a context for TPM base services 310 when it started up and keep that context active until it shuts down.

However, it should be noted that in some systems, the TPM base services 310 may enforce limits on contexts that are designed to more closely map contexts to the entities that are creating them. For example, the TPM base services 310 may allow a process to create only one context, and may not allow deleting of that context until the process is destroyed, thus preventing the context from forcing a reset of VPCRs that are not supposed to be resettable. In addition, each such context should have some sort of identifier (UUID) associated with it that identifies the entity that is associated with the context, such as a process ID. In an exemplary embodiment, a IJUD identifier is used that is unique across both space and time in accordance with IEEE 802 to identify PCRs used by a client of the TPM base services 310 of the invention. The UUID is also ideally long enough and unique enough that attempts to change it indicate attempts to change the value associated with it, which may identify the name of an application program and its environment, for example. The TPM base services 310 are responsible for associating this UUID identifier with the context, rather than having the context specify it, to prevent contexts from impersonating other contexts. All virtualization in the TPM base services 310 is thus performed on behalf of a specific context identified by a specific UUID, and only that context is allowed to access virtual resources created on its behalf, as well as the actual physical resources on the TPM 310 corresponding to those virtual resources.

Figure 5:
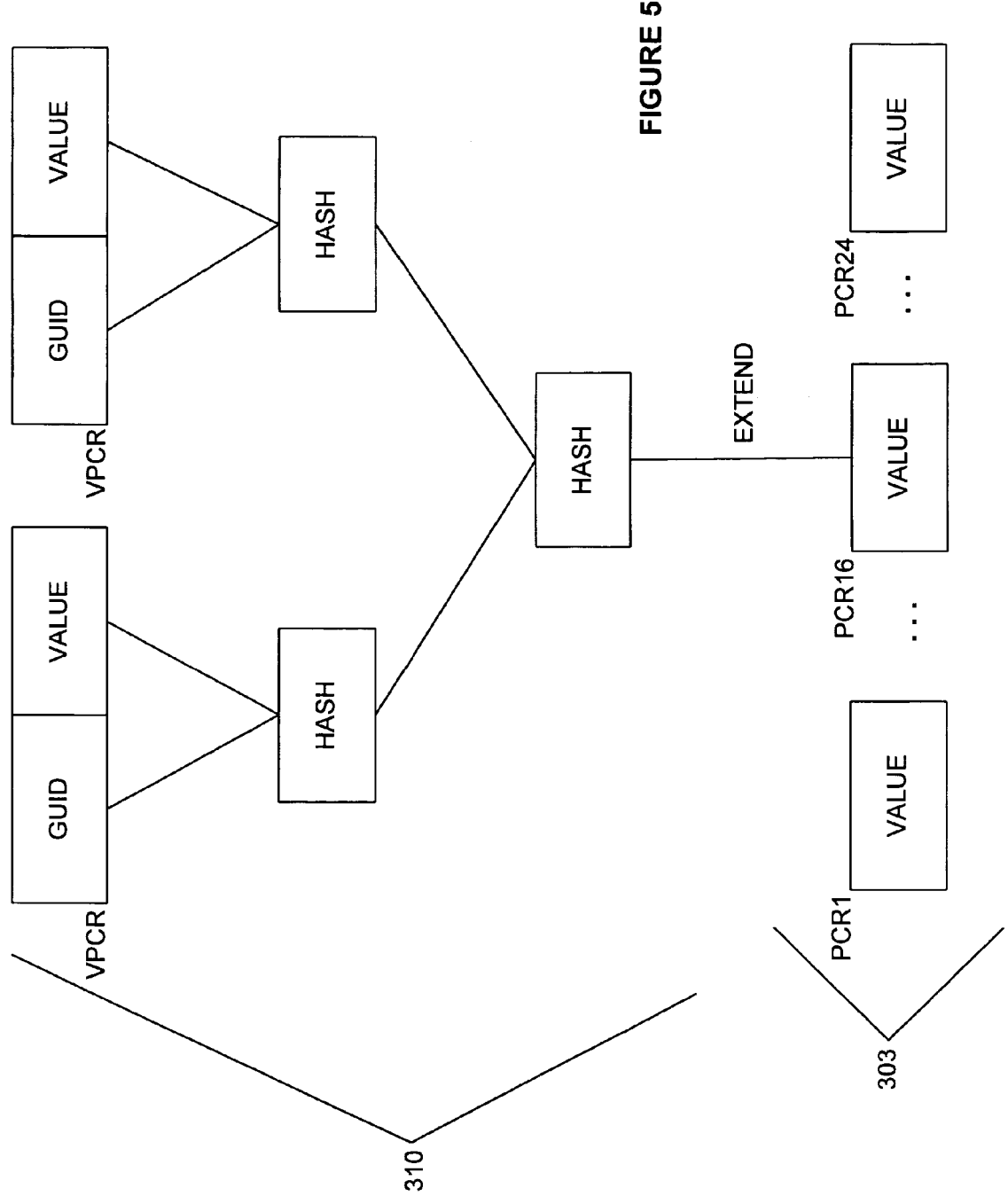
FIG. 5 illustrates the technique for loading a virtual PCR of the invention into a physical PCR for access to TPM functionality.

PCRs are a special case resource within the TPM 300. Because of their nature, they cannot be transparently virtualized in software. At the same time, since there are a limited number of physical PCRs, it is important to provide some means for software to share them. The invention solves this problem by providing an unlimited number of VPCRs to calling applications, but using the VPCRs to extend a single physical PCR whenever a context is executing a command that requires PCR access. Since it is desired that the TPM base services 310 have the ability to arbitrarily reset and extend the physical PCR that it uses, a resettable physical PCR (e.g., PCR 16) is chosen for this purpose. This physical PCR is resettable under the control of the TPM base services 310, which ensures that no other application can directly reset or modify the physical PCR. The TPM base services 310 may reset the physical PCR and load in whatever it wants when it issues commands to the TPM 300. The clients of the TPM base services 310, on the other hand, can say what they want to be loaded into the PCR when commands are issued. The TPM base services 310 creates a data structure containing the contents of the VPCRs requested and their names (UUIDs), hashes them, and resets and loads a physical PCR with the resultant value. As shown in FIG. 5, this hashing allows multiple VPCR values to be hashed together into a single physical PCR value that may be used for "quoting" by the TPM 300, for example.

The calling software can choose which of the VPCRs is used to extend the physical PCR, and can choose which physical PCRs are used in any TPM command that makes use of the PCRs. For example, a TSS could choose to create sixteen VPCRs, and to use those VPCRs to shadow the physical PCRs. The TSS could then indicate that during an upcoming operation it wants to use VPCRs zero through three to set the value of the physical PCR allocated to the TPM base services 310. The software component 300 would then reset the resettable PCR (e.g., PCR 16 in FIG. 5) and extend it with the hash of virtual PCRs zero through three in the TSS's context. If the TSS then submitted a "seal" command, it would choose to "seal" to PCR 16, which contains the hash of all of the VPCR information. Typically, PCR 16 is reset when switching contexts and is extended with the security identifier of the context after reset. Each VPCR is reset to zero when it is created. If a VPCR is resettable, it is set to zero and then extended with the value one.

Those skilled in the art will appreciate that a VPCR in accordance with the invention has the same semantics as a physical PCR, but is implemented entirely in software. A new VPCR may be used by client software to create a log, which can then be extended into a physical PCR at the client software's request. While a physical PCR starts at zero and is "extended" as needed, the start value of a VPCR may instead describe its behavior. For example, when created, a resettable VPCR contains zero, while a not-resettable VPCR contains zero extended with 1. Of course, the start value may also be used to convey other information about the VPCR. In any case, when a VPCR is created, the caller specifies whether or not that VPCR may be reset or only extended. The VPCR is initialized at creation and after reset (if allowed) to all zeroes, and then extended with the value 1 if the VPCR may be reset by the client. VPCRs that are resettable may be deleted at any time by the context. Non-resettable VPCRs may not be deleted and may remain active until the context itself is destroyed.

The TPM base services 310 also may define specific UUIDs as well-known measurements. For example, TPM base services 310 could reserve a UUID to represent the measurement of the context. In these cases, the TPM base services 310 may extend additional information into the VPCR after a reset.

In an exemplary embodiment, the VPCRs are the same size as the underlying physical PCRs and have the same semantics with regard to the "extend" function. However, the initialization and reset semantics are slightly different. As described above, when a VPCR is initialized or reset, it is set to all zeroes, and then extended with a value that indicates whether or not it may be reset.

Also, a VPCR may be reset to a particular identifier value of a context that previously created a VPCR with the specified identifier value. The VPCR may also be extended if the context has been previously created with the specified identifier value. In the latter case, the TPM base services 310 may compute a SHA-1 hash of the given data (SHA-1 turns the bytes into a 20 byte number) and then extend that hash into the VPCR. In addition, the physical PCR may be reset and extended with the hash of the specified UUIDs and associated PCR values as shown in FIG. 5, so long as the context previously created a VPCR with the specified identifier value. Whenever the TPM base services 310 starts processing commands for a specific context, it resets a resettable PCR (e.g., PCR16) to a known state and extends it with the security identifier of that context. A "select VPCRs" command causes the TPM base services 310 to perform this operation again (in case a previous select operation had already extended the physical PCR) and then extend a computed hash of the VPCR selection into the physical PCR. This hash is generated by creating a new temporary VPCR and extending that VPCR with the UUID and value of each selected VPCR in turn.

The TPM base services 310 of the invention can reserve a few physical PCRs that have special meaning and can initialize them with information that may be of use to a client of TPM base services 310 and that clients (or others) do not want the client to forge. For example, such information may include the security identification of the program (App-SID) using the TPM base services 310 to access the TPM 300, the "virtual machine identifier" of the VM-partition using the PCR as described in related U.S. patent application Ser. No. 11/072,982 filed Mar. 04, 2005, the contents of which are incorporated herein by reference, the process identification, the hash of the BIOS that booted the operating system (in a VM environment), and a credential based on application identity including, for example, the hash of a certificate that describes the process or a virtual machine. Other types of such information will be apparent to those skilled in the art.

Those skilled in the art will appreciate that the selection and operation of the VPCRs is not transparent to the client application but instead permits the client application to create a VPCR that may, for example, describe any number of attributes of the software represented by the values in the VPCR. Also, the named VPCRs may be implemented on particular physical PCRs so long as no PCRs are shared.

Those skilled in the art also will appreciate that there are multiple ways of implementing the invention, e.g., an appropriate API, tool kit, driver code, operating system, control, standalone or downloadable software object, etc. which enables applications and services to use the systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to provide security. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments of the invention have been described, the invention is not so limited. It is also intended that the invention applies to all computer architectures, not just the Windows architecture. Still further, the invention may be implemented in or across a plurality of processing chips or devices, and storage may similarly be effected across a plurality of devices. Moreover, more than one physical PCR may be software controllable in accordance with the invention. Therefore, the invention should not be limited to any single embodiment, but rather should be construed in breadth and scope in accordance with the appended claims.

What is claimed is:

1. A computer-implemented method of checking an application program of a software platform in a Trusted Platform Module (TPM) to determine if the application program can be trusted by the software platform, comprising:

a computer providing a TPM interface to virtualize at least one physical platform control register (PCR) of said TPM for storage of a log of values representative of a state of the application program and its environment;

said computer providing the TPM interface that identifies a virtualized PCR by name;

said TPM interface enabling the application program to command the TPM interface to create a data structure containing the contents of the identified virtualized PCR;

said computer hashing contents and names of one or more virtualized PCRs together and loading a resultant value into a physical PCR of said TPM, wherein one of the hashed virtualized PCRs contains the log of values representative of the state of the application program and its environment;

said TPM interface providing selective access to said identified virtualized PCR for storage of said log of values for said application program;

said TPM interface modifying or resetting said identified virtualized PCR to a value representative of a trusted state of said application program; and said TPM interface initializing at least one virtualized PCR with information of interest to said application program, said information of interest to said application program comprising a security identifier of said application program, and wherein said information of interest to said application program further comprises a virtual machine identifier of a virtual machine partition using said virtualized PCR.

2. A method as in claim 1, wherein loading resultant values into the physical PCR of said TPM provides TPM functions to values stored in said virtualized PCR, the TPM functions including at least one of TPM extend, TPM quoting, and TPM sealing.

3. A method as in claim 1, comprising the step of starting said identified virtualized PCR at a start value representative of behavior of said identified virtualized PCR.

4. A method as in claim 1, comprising the further steps of hashing at least two identified data structures together and resetting and loading said physical PCR with the hashed value.

5. A method as in claim 1, wherein the step of modifying or resetting of said identified virtualized PCR is performed by said TPM interface.

6. A method as in claim 1, comprising the further step of initializing at least one virtualized PCR with information of interest to said application program, said information including at least one of a process identifier for said application program, a hash of a BIOS that booted an operating system of said application program in a virtual machine environment, and a credential based on an identity of said application program.

7. A system for checking an application program of a software platform to determine if the application program can be trusted by the software platform, comprising:

a Trusted Platform Module (TPM) including a cryptographic processor and at least one physical platform control register (PCR); and a computer readable medium excluding signals, said computer readable medium including instructions for a TPM interface, said TPM interface virtualizing at least one physical PCR of said TPM for storage of a log of values representative of a state of the application program and its environment, identifying a virtualized PCR by name, enabling the application program to command the TPM interface to create a data structure containing the contents of the identified virtualized PCR and its name, hashing contents and names of one or more virtualized PCRs together and loading a resultant value into a physical PCR of said TPM wherein one of the hashed virtualized PCRs contains the log of values, selectively accessing said identified virtualized PCR for storage of said log of values for said application program, modifying or resetting said identified virtualized PCR to a value representative of a trusted state of said application program, and initializing at least one virtualized PCR with information of interest to said application program, wherein said information of interest to said application program comprises a security identifier of said application program, and wherein said information of interest to said application program further comprises a virtual machine identifier of a virtual machine partition using said virtualized PCR.

8. A system as in claim 7, wherein loading resultant values into the physical PCR of said TPM provides TPM functions to values stored in said virtualized PCR.

9. A system as in claim 8, wherein the TPM functions include at least one of TPM extend, TPM quoting, and TPM sealing.

10. A system as in claim 7, wherein said TPM interface starts said identified virtualized PCR at a start value representative of behavior of said identified virtualized PCR.

11. A system as in claim 7, wherein said TPM interface further hashes at least two identified data structures together and resets and loads said physical PCR with the hashed value for application of TPM functions to the hashed value.

12. A system as in claim 7, wherein the TPM interface prohibits anything other than said TPM interface from modifying or resetting said identified virtualized PCR.

13. A system as in claim 7, wherein said TPM interface initializes at least one virtualized PCR with information of interest to said application program, said information including at least one of a process identifier for said application program, a hash of a BIOS that booted an operating system of said application program in a virtual machine environment, and a credential based on an identity of said application program.

14. A system as in claim 7, wherein a name of each virtualized PCR is a universally unique identifier (UUID).

15. A computer readable medium excluding signals having instructions stored thereon that when executed by a processor cause said processor to implement a method comprising the steps of:

virtualizing at least one physical platform control register (PCR) of a Trusted Platform Module (TPM) for storage of a log of values representative of a state of an application program and its environment;

identifying a virtualized PCR by name;

enabling the application program to command the TPM interface to create a data structure containing the contents of the identified virtualized PCR;

hashing contents and names of one or more virtualized PCRs together and loading a resultant value into a physical PCR of said TPM wherein one of the hashed virtualized PCRs contains the log of values;

providing said application program with selective access to said identified virtualized PCR for storage of said log of values for said application program;

modifying or resetting said identified virtualized PCR to a value representative of a trusted state of said application program; and initializing at least one virtualized PCR with information of interest to said application program,
 wherein said information comprising a security identifier of said application program, and
 wherein said information further comprises a virtual machine identifier of a virtual machine partition using said virtualized PCR.

\* \* \* \* \*